March 5, 1940.　　　J. LEVY ET AL　　　2,192,520
REMOTE CONTROL COLOR CHANGER FOR PROJECTED LIGHT
Filed Oct. 7, 1936　　　5 Sheets-Sheet 1
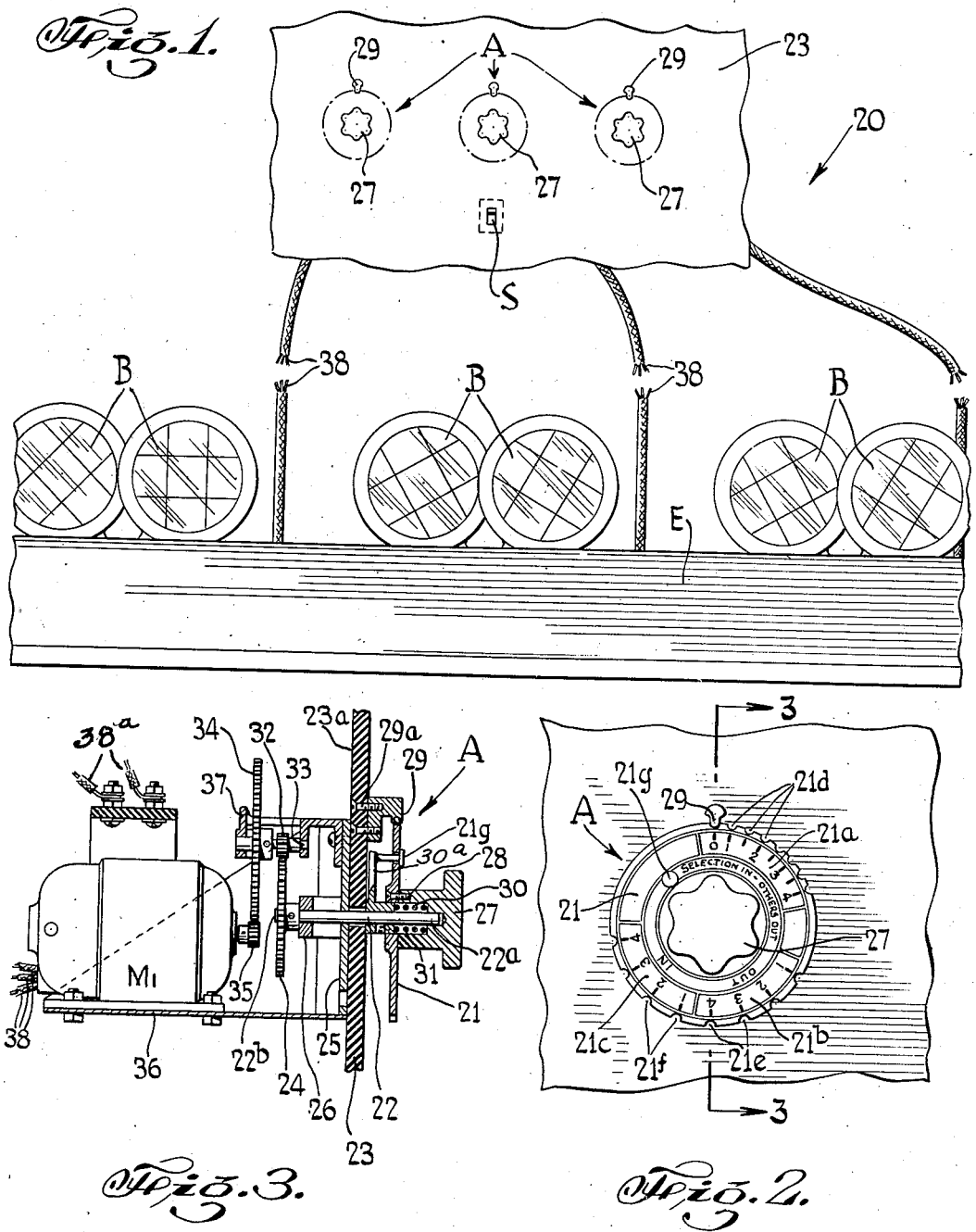
INVENTORS
Joseph Levy and
Edward B. Kirk
BY
Louis Barnett
ATTORNEY March 5, 1940.  J. LEVY ET AL  2,192,520
REMOTE CONTROL COLOR-CHANGER FOR PROJECTED LIGHT
Filed Oct. 7, 1936  5 Sheets-Sheet 2
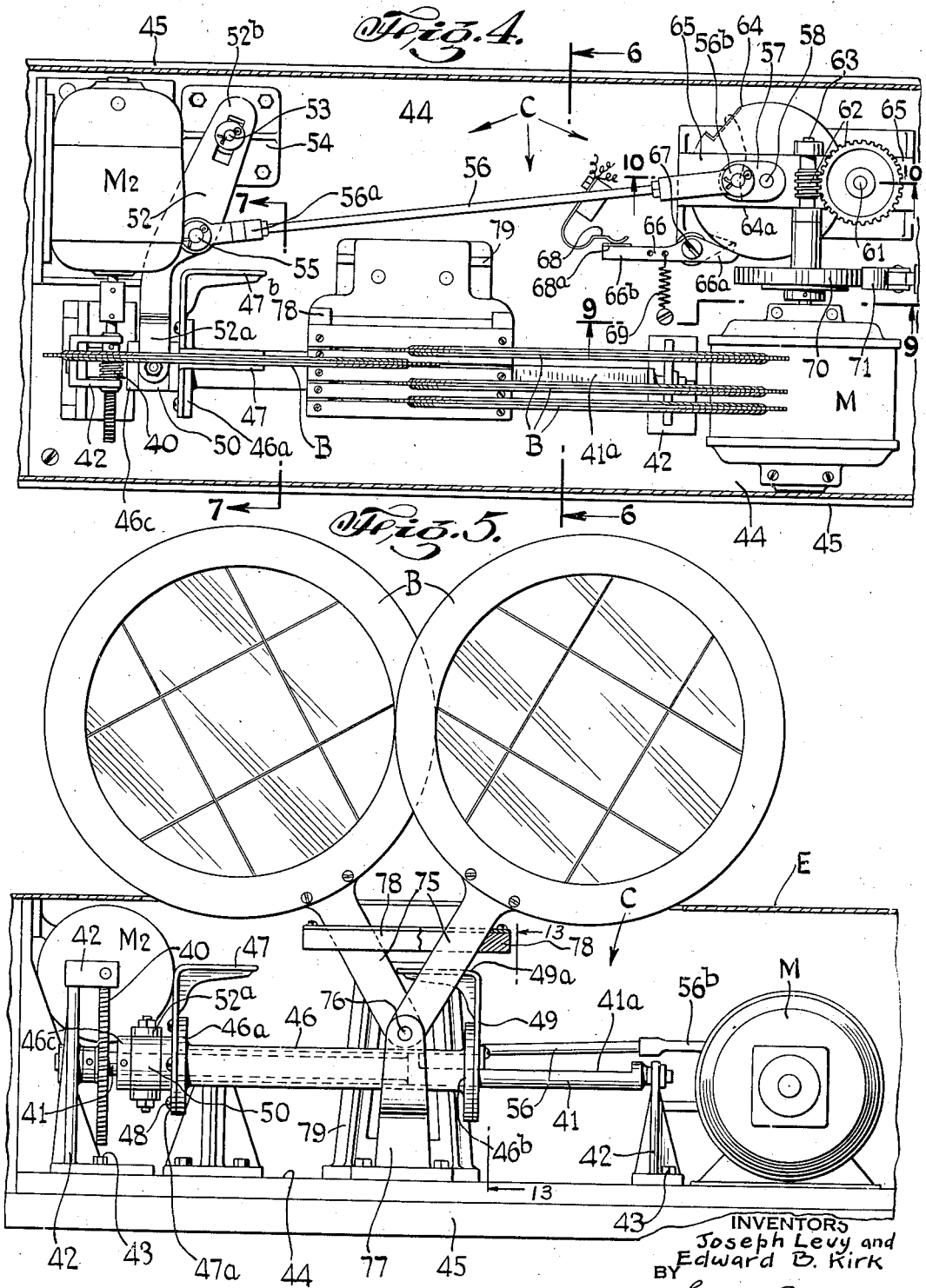

March 5, 1940.　　　J. LEVY ET AL　　　2,192,520
REMOTE CONTROL COLOR CHANGER FOR PROJECTED LIGHT
Filed Oct. 7, 1936　　　5 Sheets-Sheet 3
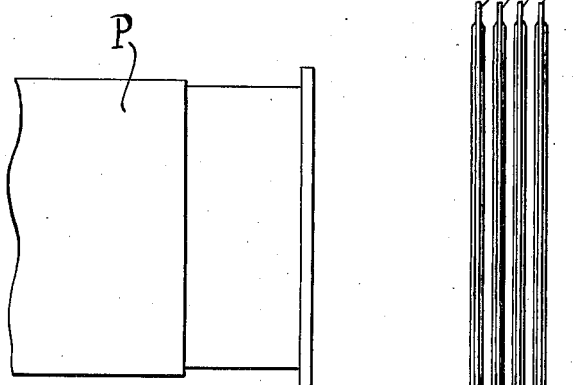
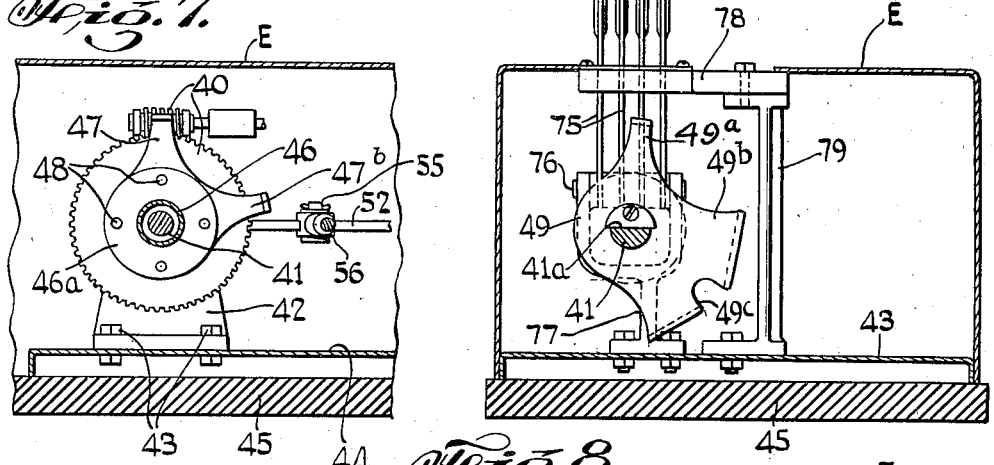
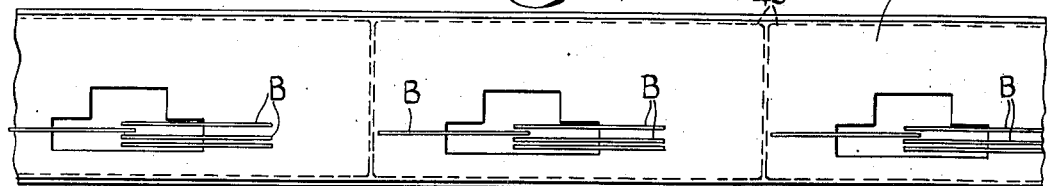
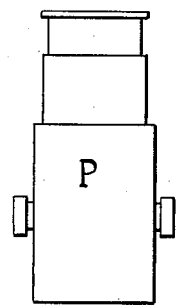
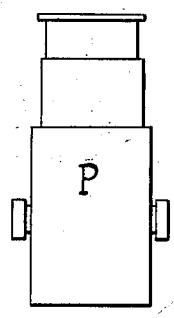
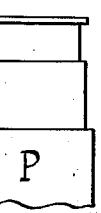
INVENTORS
Joseph Levy and
Edward B. Kirk.
BY
Louis Barnett
ATTORNEY

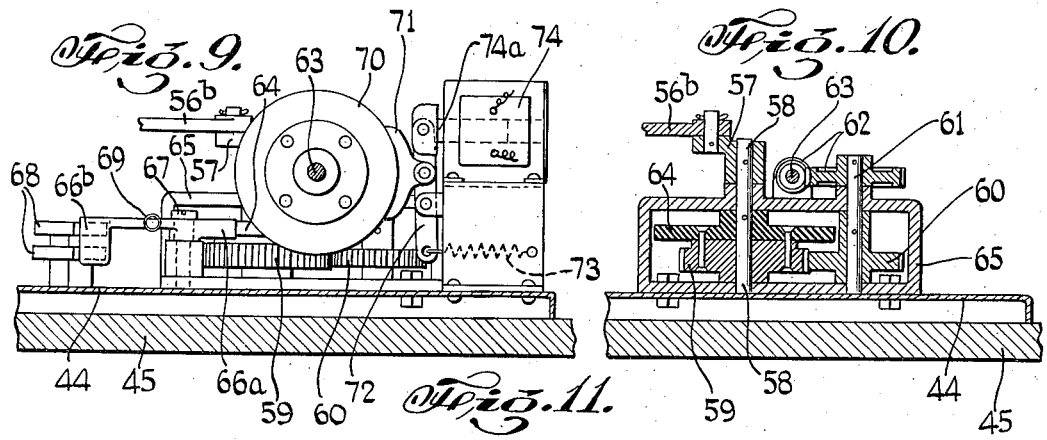
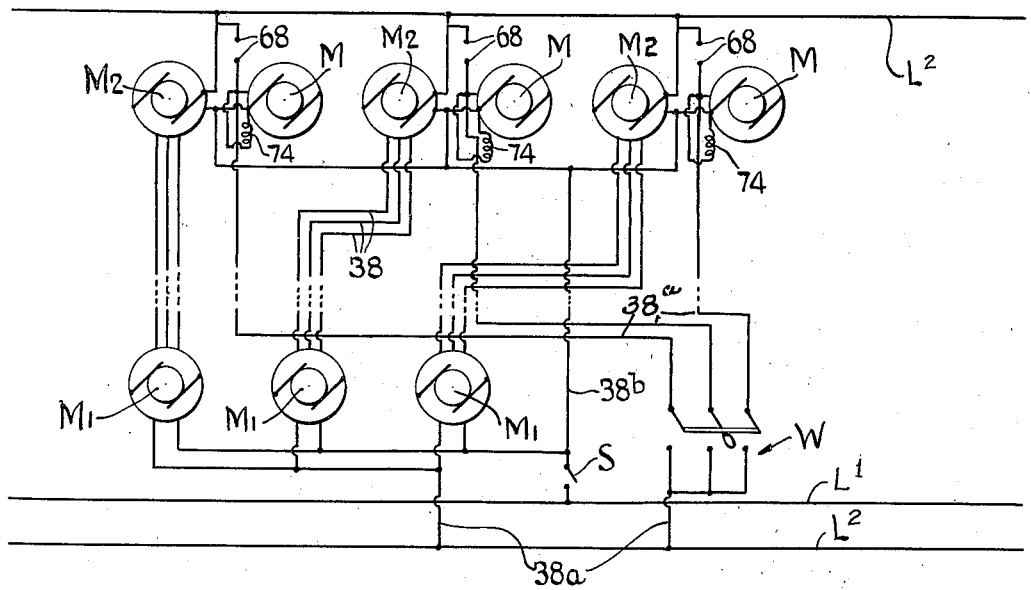
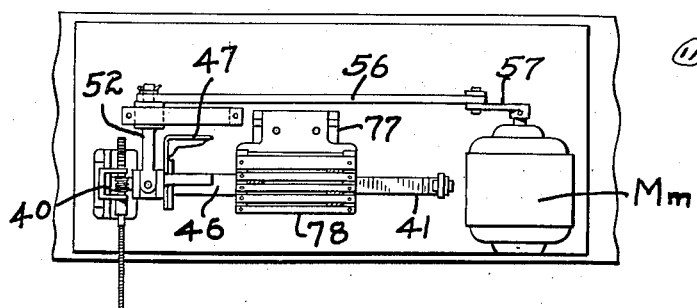

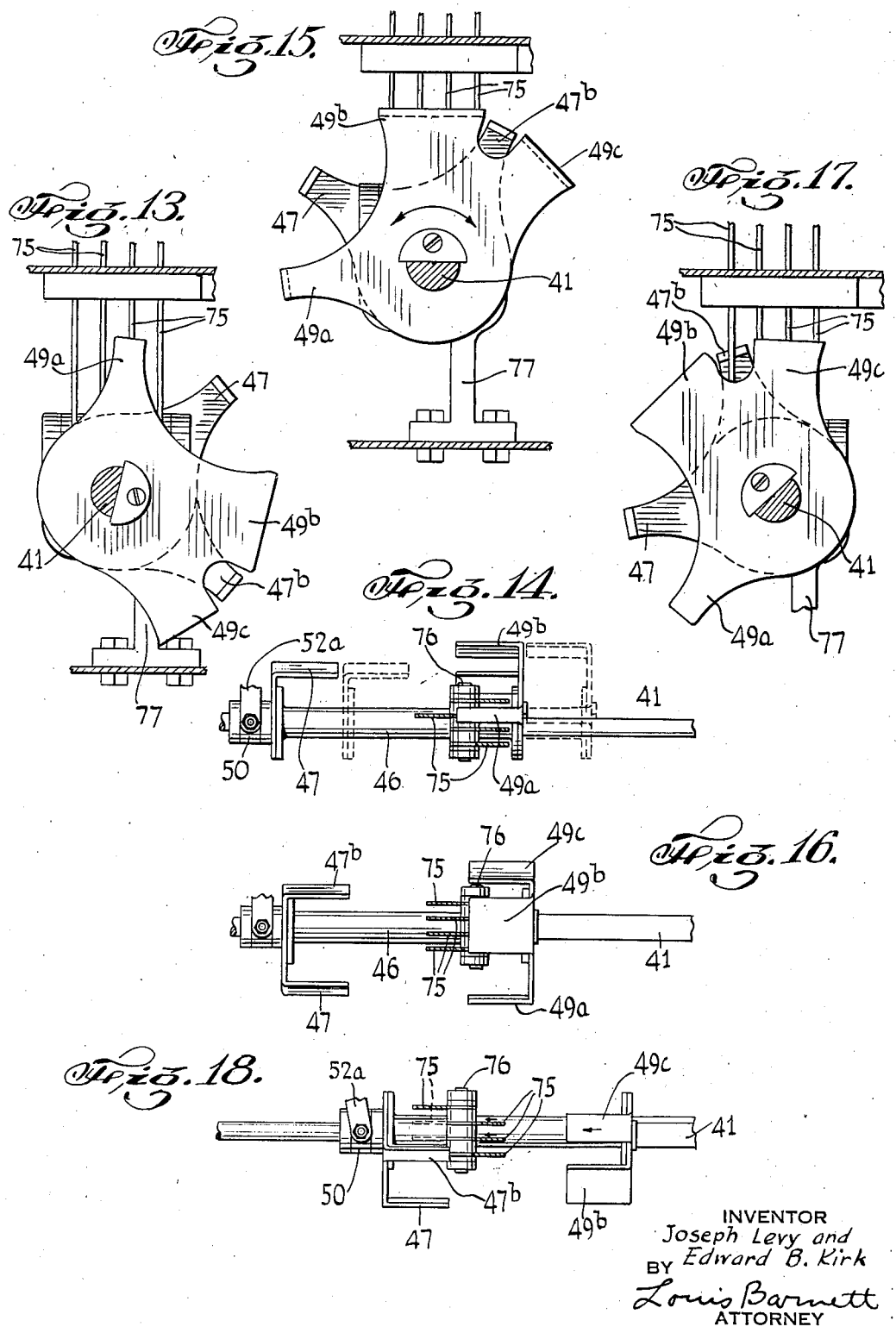

Patented Mar. 5, 1940

2,192,520

UNITED STATES PATENT OFFICE 2,192,520

REMOTE CONTROL COLOR CHANGER FOR PROJECTED LIGHT

Joseph Levy and Edward B. Kirk, New York, N. Y., assignors to Century Lighting, Inc., a corporation of New York Application October 7, 1936, Serial No. 104,352

22 Claims. (Cl. 240—3.1)

This invention relates to automatic means for changing the color of projected light such as used in stage lighting, for production of decorative and artistic lighting effects, and for other like purposes. More particularly, the invention is directed to a presettable remote control apparatus for automatically changing the color of projected light from single or multiple sources.

Among the objects of the invention is to provide a remote control color changing apparatus of the character described in single or multiple units which shall comprise of few and simple parts compactly assembled, which shall be easy to manipulate, which shall provide novel means for presetting desired color changes for each source of projected light, which shall be inexpensive to manufacture and install, which shall be reliable in operation, require minimum attention, and which shall be efficient and practical to a high degree in use.

Other objects of this invention will in part be obvious and in part hereinafter pointed out.

The invention accordingly consists in the features of construction, combinations of elements, and arrangement of parts which will be exemplified in the constructions hereinafter described, and of which the scope of application will be indicated in the following claims.

In the accompanying drawings, in which are shown various possible illustrative embodiments of this invention, Figure 1 is a front elevational view showing portions of an installation (3 units) of a presettable remote control apparatus for automatically changing the color of projected lights constructed to embody the invention.

Figures 2 and 3 are front and side elevational views, respectively, of the presetting means for desired color changes of one of the units of said installation, the side elevational view being shown partly in section.

Figures 4 and 5 are top and front elevational views, respectively, of the color screen moving mechanism for swinging one or more of the screens into effective position.

Figures 6 and 7 are cross sectional views taken on lines 6—6 and 7—7, respectively, in Figure 4.

Figure 8 is a top plan view showing the screen portions of the three remote control color changing units with three screens of each unit in effective position.

Figures 9 and 10 are sectional views of the motor single-stroke drive transmisison taken on lines 9—9 and 10—10, respectively, in Figure 4.

Figure 11 is a wiring diagram for said remote control screen changing installation shown in Figures 1 to 10, inclusive.

Figure 12 is a top plan view showing another construction of an installation embodying the invention.

Figure 13 is a detailed view as seen from lines 13—13 in Fig. 5.

Figure 14 is a top plan view of that shown in Figure 13. The dotted line position of the arms shows the traveler member located in its extreme moved position opposite that shown in the full lines.

Figure 15 is a view similar to that shown in Figure 13 with the arms of the traveler member turned into position for moving all the screens out of the path of the projected light beam.

Figure 16 is a top plan view of that shown in Figure 15 after said traveler member has moved all the screens into ineffective position.

Figure 17 is a view similar to Figure 13 with the traveler member in position for moving one of the screens into effective position and thereafter for moving the remaining screens into ineffective positions, and Figure 18 is a top plan view of that shown in Figure 17 with the traveler member positioned after moving one of the screens into effective position.

Referring in detail to the drawings, a presettable remote control color changing apparatus 20 constructed to embody the invention is shown in Figure 1. Said apparatus 20 comprises several units which accommodate the remote control changing means for multiple sources of projected light, three units being shown, one unit being applied to each electric light projector P of conventional construction, such as commonly used for stage, decorative or flood light, as shown in Figures 6 and 8.

Each of said units comprises a presetting mechanism, or preselector A, shown in detail in Figures 1, 2 and 3, a set of color screens B, shown in Figures 1, 4, 5, 6 and 8, a motor-driven mechanism C for moving the color screens shown in Figures 4 and 5, and a control switch S for initiating, that is, putting the motor-driven mechanism C in operation for changing the color screens to correspond to the presetting of mechanism A, shown in the wiring diagram circuit in Figures 1 and 11.

In the embodiments of the invention shown in the drawings, Figures 1 to 11, inclusive, the presetting mechanism A of each unit has incorporated therein a pair of "Selsyn" motors designated as transmitter M1 and receiver M2, and an electric motor M for mechanism C interconnected in the system for moving the color screens B in and out of effective position, the switch S serving to simultaneously control all the electric motors M in the manner hereinafter described and as shown diagrammatically in Figure 11.

The presetting mechanism or preselector A for each unit is seen to comprise a circular plate 21 which is mounted on the front end 22a of a shaft 22 which extends through a panel board 23, the rear end 22b of said shaft having mounted thereon gear wheel 24. Suitable means, such as back plate 25 and bracket 26 mounted on the rear side 23a of the panel 23, serve to journal the shaft 22 as is clearly shown in Figure 3. The circular plate dial 21 has mounted to project from the front side thereof a handle or knob 27 which may be secured in place by screws 28. The circular plate dial 21 is made to cooperate with suitable detent means for determining and marking definite points of rotation or turning movement.

As here shown, the dial 21 is divided into three adjoining sectors marked "Selection in—other out" and indicated at 21a, "Out", indicated at 21b, and "In" indicated at 21c. Each of these sectors has on the circular peripheral edge thereof spaced notches 21d, 21e and 21f, respectively. Said notches may be numbered 1 to 4, etc., to correspond to the number of color screens B provided in each of the units. The detent means include a relatively stationary tooth 29 secured by screws 29a to extend from a spaced distance in the front of the panel board 23 at the top of the dial 21, as shown in Figures 2 and 3. The dial 21 with the knob 27 is mounted for reciprocable movement on the shaft end 22a on a bushing 30, the latter being keyed or similarly firmly secured on the shaft end 22a, as for example, by a set screw in the manner shown in Fig. 3. The knob 27 is retained in an extended position by a coil compression spring 31 so that the tooth 29 engages one of the sector notches in the periphery of the dial 21 to releasably retain said dial in a fixed position after being rotated. To interconnect the dial 21 for turning movement with the shaft end 22a through the knob 27 and the bushing 30, a suitable stop 21g is provided to project from an arm 30a, the latter radially extending from the bushing 30 as shown in Fig. 3.

As is clearly seen from Figs. 2 and 3 the stop 21g permits limited movement of the dial 21 with respect thereto, said stop 21g having a headed free end which projects beyond the dial for engaging the same to prevent the knob and dial from being forced off of the shaft end 22a.

From Figures 2 and 3, it is seen that when it is desired to turn the dial 21, the latter is released by pushing the knob 27 in against the action of the spring 31 so that the tooth 29 is free from engagement with the notch 21d and may then be freely turned for rotating with the shaft 22 and the gear wheel 24. On releasing the knob 27 the spring 31 forces the dial 21 outward again permitting the engagement of the tooth 29 with an aligning notch. The gear wheel 24 may form part of a reduction gearing comprising a pinion 32 which turns with a counter shaft 33 journalled in a hanger bracket 37, a gear wheel 34 secured to turn with said shaft 33, and a shaft pinion 35 on the transmitter "Selsyn" motor M1, the latter being mounted on a bracket base 36. Said base 36 and bracket 37 are rigidly mounted to back plate 25, as is clearly shown in Figure 3.

It is thus seen that in the above described embodiment of the invention the turning of the dial 21 with the interconnecting gearing rotates the transmitter "Selsyn" motor M1, this assembly with panel 23 being mounted at any desired location away from the remaining parts of the apparatus 20 hereinafter described, that the rotation of the transmitter "Selsyn" motor M1, corresponding with the turning movement of the dial 21, is transmitted by means of the three conductor cables 38 to the receiver "Selsyn" motor M2, and a two conductor cable 38a supplying the power in the well understood manner. As shown in Figures 4, 5 and 7, the receiver "Selsyn" motor M2, through a worm and wheel drive 40 rotates a bearing shaft 41 journalled between spaced bracket arms 42, each of which is secured by bolts 43 to a suitable platform 44. The latter and the entire mechanism for actuating the movement of the screens B, with the exception of the projecting portions of said screens B, per se, may be enclosed in a suitable casing E provided with a base board 45 on which the platform 44 is mounted, as shown in Figures 5 to 8, inclusive.

Bearing shaft 41 is splined along the length thereof as at 41a and mounted thereon for reciprocation movement a traveller member 46 is provided which terminates at the end 46a thereof adjacent the worm and wheel drive 40 in a pair of spaced radially extending inturned pusher arms 47, 47b, said arms being attached to the end 46a of said member 46 through a hub portion 47a and bolts 48. The end 46b of the traveller member 46 opposite the end 46a has secured thereto a pusher fitting 49, said fitting having three spaced radially extending inturned arms 49a, 49b and 49c. As shown in Figure 6, said arms are unequally spaced apart and are of different widths being sized and located to permit selective positioning effective for pushing or clearing a different number of screens B to correspond with the setting of the presetting mechanism A. The traveller member 46 rotates with the shaft 41 having the same relative angular movement as that given dial 21 on turning knob 27 and also reciprocates on said shaft 41. For reciprocating said traveller member 46 an integrally formed collar extension 46c is provided which projects outward from the hub portion 47a. Said extension 46c carries a rotary collar 50 which has pivotally connected thereto a forked end 52a of a lever 52. The other end 52b of said lever 52 opposite end 52a may be pivoted at 53 on a block 54 which is bolted to the platform 44, as shown in Figures 4 and 5.

Pivoted at 55 to the mid-portion of the lever 52 is one end 56a of a connecting rod 56. The other end 56b of said connecting rod 56 opposite end 56a forms part of a crank connection 57 terminating a drive shaft 58, as shown in Figures 4 and 10. The shaft 58 carries a gear 59 which meshes with another gear 60, the latter being pinned to turn with a countershaft 61. The latter connects through a worm and wheel drive 62, with the drive shaft 63 of the motor M. Also secured to turn with the shaft 58 is a disc cam 64 which preferably is made of insulating material. Said cam 64 may be riveted to the gear 59 as shown in Figure 10.

The shafts 58 and 61, gears 59 and 60 and the disc cam 64 may be enclosed in a casing which is constructed to serve as bearings for said shafts with the worm and wheel drive 62 and the crank connection 57 extending beyond said casing as is clearly shown in Figure 10.

The disc cam 64 is circular in shape and has provided in the periphery thereof a notch 64a which cooperates with one end 66a of a dog 66, the latter being pivoted at a mid-portion 67 thereof to the casing 65 as shown in Figures 4 and 9.

A suitable spring 69 urges the end 66a of the dog 66 to ride on the periphery of the disc cam 64 for swinging the end 66b of said dog 66 opposite end 66a which carries a bridging jumper 68a to make and break the contact whereby the circuit through spaced fingers 68, is closed and opened. While the end 66a rides on the circular periphery of the disc cam 64 the contact is made and the circuit is closed. When said end 66a enters the notch 64a due to the movement of the dog 66 by the action of the spring 69 as is clear from Figures 4 and 9 the contact is broken and the circuit opened.

A suitable brake may be provided on the motor shaft 63 for quickly bringing the motor M to a stop when the dog end 66a enters the disc cam notch 64a. As shown in Figures 4 and 9 said brake includes a drum 70 mounted to turn with the shaft 63, a brake shoe 71 which may be controlled electrically of any conventional construction, as for example, by the provision of a constant pressure lever 72 having a tension spring 73 and an electric magnet or solenoid 74, the armature 74a of which acts on lever 72 to release pressure of the brake shoe 71 against the action of the spring 73 in the well understood manner.

The above described electrically operated parts are each connected in circuit as shown diagrammatically in Figure 11. The control panels 23 with the presetting mechanism A shown in Figures 2 and 3 of each unit mounted thereon, may be positioned on the stage or other convenient place while the remaining apparatus forming the installation may be located in the balcony or any other place where the projectors are located, there being provided the cable 38 for interconnecting each of the transmitter motors M1 with a receiver motor M2, the feed cables 38a for supplying power from the lines L1 and L2 to said motors, and one lead 38b of said cables 38a may include the control switch S in the circuit. Preferably a disconnecting switch W may be connected in the feed circuit to each unit as diagrammatically shown in Figure 11.

From the above description and Figures 1 to 11, inclusive, of the drawing, the portion of the presettable remote control apparatus 20 for automatically changing the color of projected light from a single or multiple source will now be apparent.

First, the turning of the dial 21 of the presetting mechanism or preselector A to engage the notch marked "O" with the detent means 29, as shown in Figure 2, will turn the Selsyn motor M1 and cause its receiver motor M2 to take a position so as to rotate the bearing shaft 41 to bring the radial arm 49b to extend upward in an effective position for cooperating with all of the screen holders 75 of the screens B. See Figures 15 and 16.

The switch S is next momentarily closed to initiate the screen movement present on the dial 21, said switch being of the spring type which is normally open when released. The circuit to the motor M is thus energized and will cause the latter to make only a single complete revolution. This latter action takes place due to the entering of the dog end 66a in the cam notch 64a, once each revolution, for opening the circuit at the spaced fingers 68 thus automatically cutting off the power. The brake magnet 74, which is connected in circuit to be energized simultaneously with the making of the circuit of the motor M, will cease to be effective permitting the brake shoe 71 to be applied, thereby eliminating any overrun beyond one revolution of motor M. During the revolution of motor M, the crank 57 is rotated to swing the lever 52 for oscillating the traveller member 46 only two complete strokes, carrying the arm 49b in upright position toward and away from the screen holders 75. This reciprocation of the arm 49b will move all the screens B into ineffective positions out of the path of the light beam from the projector P and clear the path to permit the free passage of an uncolored light beam. Said arm 49b as shown in Figures 15 and 16 is made of sufficient width to contact with all the bracket arms 77.

Said screen holder 75 is pivotally mounted at 76 on the bracket arm 77, the latter being bolted to extend up from the platform 43, as shown in Figure 6. To limit the swinging movement of said screen holder 75, suitable stop means, as for example, a slotted member 78 is provided which may be secured to a stanchion 79, the latter being bolted on the platform 43, as shown in Figures 4, 5 and 6.

If now, it is desired to bring one of the color screens B into effective position, the knob 27 of the mechanism A is turned to engage the detent 29 with one of the notches 21d, marked 1, 2, 3 or 4. If the notch marked 4 of the section of the dial 21 "Selections in, others out" is caused to engage the detent 29, the transmission "Selsyn" motor M1 will cause its receiving motor M2 to locate one of the arms, namely, 47b in position to register with one of the screen holders 75 as shown in Figure 17. Again on momentarily closing the switch S the motor M would be started and traveller member 46 would be caused to reciprocate the arm 47b pushing one of the holders 75 for moving a screen B corresponding to the number indicated under the setting of notch 21a from its ineffective position to an effective position in front of the projector P as shown in Figure 18. The motor M will make a single revolution and the design of the traveller member 46 is such that the arms of the pusher fitting 49 will clear the screen holder 75 which has been moved into effective position by the arm 47.

If at any time it is desired to bring in a second screen into effective position, the dial 21 is rotated by means of the knob 27 so that one of the notches 21f on the sector marked "In" is brought in registered with the detent means 29 for actuating the Selsyn motors M1 and M2. Then on momentarily pressing the switch S such screen will be moved into effective position by the operation of the motors M, the arms of the fitting 49 and the traveller member 46 being so designed as not to displace the other screen or screens from their effective positions.

As seen from Figures 13, 15 and 17, the arms 49a, 49b and 49c are so proportioned that arm 49c is narrower than 49b and when in effective position will displace three screens leaving the others as shown in Figure 17. Arm 49a which is narrower than arm 49c when in effective position will displace only one screen to leave the others as shown in Figure 13. The arm 49b as aforesaid when in effective position displaces all the screens as shown in Figure 15 and clears the path of the projected light.

As has been described above, when the dial is rotated for engaging with the detent means 29 on the third sector marked "In", the fittings 49 of the traveler member 46 will align themselves so as not to displace any other screen or screens which may be in effective position. However, if the dial is positioned to engage the notch 21e in the section marked "Out", the corresponding numbered screen will be moved from effective position to an ineffective position, and if the dial 21 is engaged the notch 21d of the section marked "In, others out" then that particular numbered screen will be first brought into effective position and all the other screens then moved to ineffective position.

When two or more screens are in effective position, and it is desired to take one of them out, the dial 21 is rotated by means of knob 27 until one of the notches 21e in the sector marked "Out" is brought in registered with the detent means 29. If for example, all four screens B were in effective position and it is desired to take out the third screen, the dial 21 would be rotated until the notch 21e of the sector "Out", marked numeral "3", is brought into register with the detent means 29. Now on momentarily pressing the switch S the motor M will be set in operation and the traveller member 46 reciprocated. Under the above circumstances, the arm 49a is brought in alignment with the third screen holder 75 by the presetting mechanism as shown in Figs. 13 and 14, and on the above described movement of said member 46 the third screen will be pushed out of effective position. In Figures 4, 5 and 6 there is shown the positions of the various parts during such removal of the third screen.

It will be noted from Figure 2 that there are notches 21d intermediate the notches numbered 1 and 2, 2 and 3, 3 and 4 in the disc sector "Selection in—other out". By presetting mechanism A at any one of these intermediate notches 21d, one of the arms 47b will be located in a position to register with two adjacent screen holders 75 instead of aligning with a single one. Thus on momentarily pressing the switch S, two screens instead of one will be moved into effective position. Arranging the screen holders 75 so that the screens B most frequently used together are adjacent one another it is possible in the installation above described and shown in the drawings by a single presetting to bring two screens into effective position simultaneously in each unit.

Thus it is seen that any desired color screen or any two adjacent screens may automatically be moved into effective position or an additional screen may be brought into effective position, or if desired, any one or all the screens may be removed from their effective positions merely by a single presetting of the dial 21 and the momentary operation of the switch S. It should be noted that the traveller member 46 is reciprocated so that the arm 47b is first moved into an effective position and thereafter the fitting 49 is moved in a direction which would cause the arms 49a, 49b and 49c, if properly positioned, to swing the screen holders in a non-effective position. Through this arrangement the apparatus is made "fool-proof", that is, the screens are placed in effective position before any screen is removed from such position, thus eliminating any possibility of permitting the projected light beam to be accidentally left without a proper screen.

From Figures 1 and 11, it is seen that a plurality of units may form a single installation, three such units being illustrated here. The units are each preset by its own mechanism A and a single switch S is utilized to make the screen color changes of all the units concomitantly.

In Figure 12 there is shown another modification of one unit of the invention. Here the electric means, namely, the transmitter-receiver, "Selsyn" motors M1 and M2 for adjusting the turning of the bearing shaft 41 with the traveller member 46 is replaced by any suitable mechanical transmission in the form of a flexible shaft drive D which may be of any conventional construction.

In this modification a motor Mm may be provided which is constructed with internal means to give only a single rotation of its motor shaft on application of power. Such means, even though of special design are well known in the art and are not shown. Use of motor Mm will eliminate in the installation, many parts connecting the shaft 63 of motor M with the crank connection 57 above described.

It will thus be seen that there is provided an apparatus in which the several objections of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters Patent:

1. A light projecting source, a plurality of light varying means mounted to move in and out of effective position with respect to said source, means to preset selective movements for said varying means prior to actuation thereof, means for moving said varying means to correspond to the setting of said presetting means, and means to initiate the actuation of said moving means.

2. A light projecting source, a plurality of light varying means mounted to cooperate with said source, means to preset selective movements for said varying means prior to actuation thereof, means for moving said varying means in and out of effective position with respect to said source, means for directing the movement of said varying means to correspond to the selective setting of said preset means, and means to control the actuation of said moving means.

3. In an installation of the character described, spaced light projecting sources, a plurality of light varying means mounted to move in and out of effective position with respect to each source, means to present selective movements for each varying means prior to actuation thereof, and a single motor means for simultaneously moving the varying means of each source to correspond to the presetting means thereof.

4. In an installation of the character described, spaced light projecting sources, a plurality of light varying means mounted to move in and out of effective position with respect to each source, means to preset selective movements for each varying means prior to actuation thereof, and a single motor means for moving each varying means of each source to correspond to the setting of its presetting means, and a single control to cause said moving means to be simultaneously actuated.

5. In a device of the character described, a light projector, a movable screen for changing the color of the light beam from said projector, in combination with an electrically operated remote control including a traveler member, and means for rotating and reciprocating said member to move the screen in and out of effective position in the path of the projected light beam.

6. In a device of the character described, a light projector, movable screens for changing the color of the light beam from said projector, in combination with a traveler member, means for rotating and reciprocating said member to move the screens in and out of effective position in the path of the projected light beam, and means to preset the movement of said member.

7. In a device of the character described, a bearing shaft, a traveler member mounted for reciprocating movement on said shaft, means for rotating said shaft and traveler member, a plurality of movable screens adapted to change the color of a projected light beam, and means carried by said traveler member to move said screens as selected by rotation of said member in and out of effective position upon reciprocation of said member.

8. In a device of the character described, a bearing shaft, a traveler member mounted for reciprocating movement on said shaft, means for rotating said shaft and traveler member, a plurality of movable screens adapted to change the color of a projected light beam, pushers carried by said traveler member to move said screens as selected by rotation of said member in and out of effective position upon reciprocation of said member, and means to preset the movement of said member for the selective movement of the screens.

9. In a device of the character described, a bearing shaft, a traveler member mounted for reciprocating movement on said shaft, means for rotating said shaft and traveler member, a plurality of movable screens adapted to change the color of a projected light beam, pushers carried by said traveler member to move said screens as selected by rotation of said member in and out of effective position upon reciprocation of said member, means to preset the movement of said member for the selective movement of the screens, and control means for starting the movement of said member.

10. A unit of the character described comprising a light projector, a plurality of movable screens for changing the light beam from said projector, means for selectively moving said screens in and out of the path of a light beam from said projector, means to preset the movement of said first mentioned means prior to the replacement of a screen from an effective position prior to movement thereof, and means to initiate the actuation of said moving means.

11. A plurality of units, each comprising elements as defined in claim 10, said units having their screen moving means interconnected for concomitant movement through a single control.

12. In an installation for remote control color changing of projected light, multiple units each having a plurality of movable color screens, means to preset the movement of said screens of each unit for selective operation prior to actuation thereof, said units being interconnected for concomitant operation, and a single control for simultaneously starting the operation of all of said screen moving means.

13. In a device of the character described, a light projector, a plurality of movable screens for changing the color of the light beam from said projector, a mechanism for selectively moving said screens in and out of the path of a light beam from said projector, said mechanism having means for moving a selected screen into effective position with respect to the projector prior to moving another screen out of such effective position.

14. A unit device of the character described including a plurality of movable screens for changing the color of a light beam from a projector, a traveler member and means carried by the traveler member to cooperate with each screen for selectively moving some screens in and out of the path of a light beam from said projector while the others of said screens remain unmoved on movement of the traveler member.

15. The device defined in claim 14 in which said traveler member is so constructed and arranged to simultaneously move a plurality of screens into effective position.

16. In a unit device of the character described the combination of color changing screens and a preselector for presetting movements of said screens, said screens being displaceable in and out of effective position with respect to a projected light beam, and remote control means forming part of the preselector having an indicating dial for setting various predetermined movements for any of said screens prior to actuation thereof.

17. In a unit device of the character described, a preselector for presetting movements of color changing screens, said screens being displaceable in and out of effective position with respect to a projected light beam, said preselector comprising a remote control means having a dial for indicating various predetermined movements for said screens coupled with a traveler member having means adjusted to conform with the indicated dial settings, each adjustment of said traveler means predetermining the selective movement of one or more of said screens.

18. In a unit device of the character described, screens displaceable in and out of effective position with respect to a projected light beam, a preselector for presetting said movements of said screens, a remote control means forming part of the preselector having a dial for indicating various predetermined movements for said screens, and a single transmitter-receiver "Selsyn" motor set coupled to said dial to serve in presetting changes of the preselector for movement of any and all screens.

19. A device of the character described including a plurality of movable screens, a traveler member co-operating with said screens for selectively moving some of the screens with respect to the others and for moving all of the screens in unison, means for actuating said traveler member, and means for presetting the actuation of said traveler member to move said screens in pre-determined relations.

20. The device set forth in claim 19 in which said means for presetting include a single "Selsyn" motor set.

21. The device set forth in claim 19 in which said means for actuating the traveler member includes a single motor drive.

22. A device of the character described including a plurality of movable screens for changing the color of a light beam from a projector, a traveler member, means carried by the traveler member to cooperate with each screen for selectively moving some screens in and out of the path of a light beam from said projector while the others of said screens remain unmoved, and a preselector for presetting the traveler member to move any screen for a selective movement prior to initiating such screen movement.

JOSEPH LEVY.
EDWARD B. KIRK.